(12) United States Patent
Lee et al.

(10) Patent No.: US 8,749,369 B2
(45) Date of Patent: Jun. 10, 2014

(54) TIRE POSITION DETECTING SYSTEM AND TIRE POSITION DETECTING METHOD

(75) Inventors: Kyu Cheol Lee, Uiwang (KR); Seok Chul Ahn, Seoul (KR); Hee Yong Jung, Seoul (KR); Jae Yun Joo, Siheung (KR)

(73) Assignee: Seetron Inc., Bucheon-Si (KR)

( * ) Notice: Subject to any disclaimer, the term of this patent is extended or adjusted under 35 U.S.C. 154(b) by 58 days.

(21) Appl. No.: 13/513,218

(22) PCT Filed: Nov. 30, 2010

(86) PCT No.: PCT/KR2010/008537
§ 371 (c)(1),
(2), (4) Date: Jun. 1, 2012

(87) PCT Pub. No.: WO2011/068349
PCT Pub. Date: Jun. 9, 2011

(65) Prior Publication Data
US 2012/0268263 A1    Oct. 25, 2012

(30) Foreign Application Priority Data

Dec. 3, 2009   (KR) .................... 10-2009-0119390

(51) Int. Cl.
*B60C 23/02* (2006.01)
(52) U.S. Cl.
USPC .......... 340/442; 340/445; 340/505; 340/438; 340/686.1; 340/447; 340/426.33
(58) Field of Classification Search
None
See application file for complete search history.

(56) References Cited

U.S. PATENT DOCUMENTS

| | | | |
|---|---|---|---|
| 6,489,888 B1 * | 12/2002 | Honeck et al. | 340/442 |
| 6,731,205 B2 * | 5/2004 | Schofield et al. | 340/444 |
| 6,999,861 B2 * | 2/2006 | Katou | 701/29.6 |
| 7,750,798 B2 * | 7/2010 | Mori | 340/447 |
| 8,463,491 B2 * | 6/2013 | Weston | 340/445 |
| 2003/0001735 A1 * | 1/2003 | Honeck et al. | 340/445 |
| 2003/0058118 A1 * | 3/2003 | Wilson | 340/679 |
| 2005/0187667 A1 * | 8/2005 | Vredevoogd et al. | 701/1 |
| 2006/0187014 A1 * | 8/2006 | Li et al. | 340/447 |

FOREIGN PATENT DOCUMENTS

| | | |
|---|---|---|
| JP | 2004-314726 A | 11/2004 |
| KR | 1020020050061 A | 6/2002 |
| KR | 1020020073326 A | 9/2002 |
| KR | 20-0303537 | 1/2003 |
| KR | 1020040036746 A | 5/2004 |

OTHER PUBLICATIONS

Search Report dated Jun. 28, 2011 relating to PCT/KR2010/008537.

* cited by examiner

*Primary Examiner* — Benjamin C Lee
*Assistant Examiner* — Rajsheed Black-Childress
(74) *Attorney, Agent, or Firm* — Gifford, Krass, Sprinkle, Anderson & Citkowski, P.C.

(57) ABSTRACT

The present invention relates to a system and a method for sensing positions of tires. The system for sensing the positions of the tires comprises: a plurality of transmitters having identification numbers (ID) which are attached to inner parts of a plurality of tires to detect the states of the tires; an external device which records position information of the transmitters located in a vehicle in each of the transmitters; and a receiver for receiving the IDs and the state information and the position information of the tires.

9 Claims, 6 Drawing Sheets

| preamble | ID | Position information | Pressure | Temperature | Registration number |

| Tire position number | ID | Tire state information | Registration number |
|---|---|---|---|
| 001 | 0xE1 | XXXXXXXX | 1234 |
| 010 | 0xE2 | XXXXXXXX | 1234 |
| 011 | 0xE3 | XXXXXXXX | 1234 |
| 100 | 0xE4 | XXXXXXXX | 1234 |
| ⋮ | ⋮ | ⋮ | ⋮ |

TIRE POSITION DETECTING SYSTEM AND TIRE POSITION DETECTING METHOD

CROSS-REFERENCE TO RELATED APPLICATIONS

This application is the U.S. National Phase of PCT/KR2010/008537 filed Nov. 30, 2010, which claims priority of Korean Patent Application 10-2009-0119390 filed Dec. 3, 2009.

TECHNICAL FIELD

The present invention relates to a tire position detecting system and a tire position detecting method, and more particularly, to a tire position detecting system which detects a position of a tire to which a plurality of transmitters are attached by recording tire position information in the plurality of transmitters attached to the tire using an external device and receiving the tire position information from the plurality of transmitters, and a tire position detecting method.

BACKGROUND ART

If a tire pressure of a vehicle is too high or low, the tire may burst or the vehicle may easily slide, possibly causing a big accident. Further, a fuel consumption of the vehicle becomes large, lowering fuel efficiency. In addition, the life of the tire becomes short and the comfortableness and braking force of the vehicle severely deteriorate. In detail, when a tire pressure is low, a hydroplaning phenomenon and a standing wave phenomenon may be caused. On the other hand, when a temperature of a tire is excessively high, a heat separation phenomenon may be caused.

As described above, a tire is an important factor for a safe travel of a vehicle, and in recent years, a tire pressure monitoring system (hereinafter, referred to as TPMS) also called an automatic tire pressure detecting system or a tire pressure detecting system is mounted to a tire to detect a defect of the tire in advance.

The TPMS is an RFID sensor attached to a tire, and is designed to detect a pressure and temperature of a tire and send the information to a display of a driver's seat so that the driver can check the pressure and temperature state of the tire in real time. Through the system, the durability, comfortableness, braking force of a tire can be improved and fuel efficiency can be increased at the same time, making it possible to prevent the body of a vehicle from being shaken severely during a traveling thereof.

The tire pressure monitoring system recognizes positions of tires of a vehicle first and checks rotating forces, tire pressures, temperatures of the tires to recognize the stability state of the tires, using sensors attached to the tires. Thus, the positions of the tires should be automatically recognized first to drive the tire pressure monitoring system, and low frequency initiators (LFIs) have been used to automatically recognize the positions of the tires according to the related art.

The low frequency initiators are installed in a vehicle to correspond to a plurality of tires, respectively, and transmit starting signals in low frequency zones to TPMS transmitters mounted within the plurality of tires. Then, the TPMS transmitters having received the starting signals are woke up, and transmit identifications (IDs) to TPMS receivers installed within the vehicle. The TPMS receivers recognize the positions of the tires through the IDs received from the TPMS transmitters, respectively, and display the positions on a display located in the driver's seat of the vehicle.

However, the automatic TPMS tire position recognizing system according to the related art increases manufacturing costs of a vehicle due to the low frequency initiators installed in the tires, respectively, and requires high maintenance costs when the low frequency initiators are out of order.

The above information disclosed in this Background section is only for enhancement of understanding of the background of the invention and therefore it may contain information that does not form the prior art that is already known in this country to a person of ordinary skill in the art.

DISCLOSURE

Technical Problem

The present invention has been made in an effort to provide a tire position detecting system and a tire position detecting method where tire positions are initially input to a plurality of TPMS transmitters not by using low frequency initiators attached to tires, respectively but by using an external device and then TPMS receivers automatically detect the positions of the tires to which the plurality of TPMS transmitters are attached, respectively.

Technical Solution

An exemplary embodiment of the present invention provides a tire position detecting system, including: a plurality of transmitters attached within a plurality of tires to detect state information of the plurality of tires and in which IDs of the tires are stored, respectively; an external device for recording position information of the plurality of transmitters positioned in a vehicle in the plurality of transmitters, respectively; and a receiver for receiving the IDs, the tire state information, and the position information from the plurality of transmitters.

Another exemplary embodiment of the present invention provides a tire position detecting method of a tire position detecting system, including: a plurality of transmitters attached within a plurality of tires to detect state information of the plurality of tires and in which IDs of the tires are embedded, respectively; and a receiver for receiving the tire state information, and the IDs from the plurality of transmitters. The tire position detecting method includes: receiving, by the plurality of transmitter, position information of the plurality of transmitters positioned in a vehicle from an external device located outside the vehicle, respectively; if the vehicle is determined to be in a driving mode, detecting, by the plurality of transmitters, the state information of the plurality of tires; transmitting, by the plurality of transmitters, the IDs and the position information to the receiver together with the detected tire state information; and matching, by the receiver, the tire position numbers stored in a memory of the receiver in advance with the position information and storing, in the memory, the IDs and the tire state information corresponding to position information in the matched tire position number.

Advantageous Effects

According to the exemplary embodiments of the present invention, the receiver can collectively receive tire position information from the plurality of transmitters by inputting tire position information of the initial transmitters using an external device.

Further, according to the exemplary embodiments of the present invention, the receiver can identify an ID which is not received in a driving mode and a newly received ID, and automatically detect a position of the new tire without using an external device when a tire is replaced by the new one.

MODE FOR INVENTION

Figure 1:
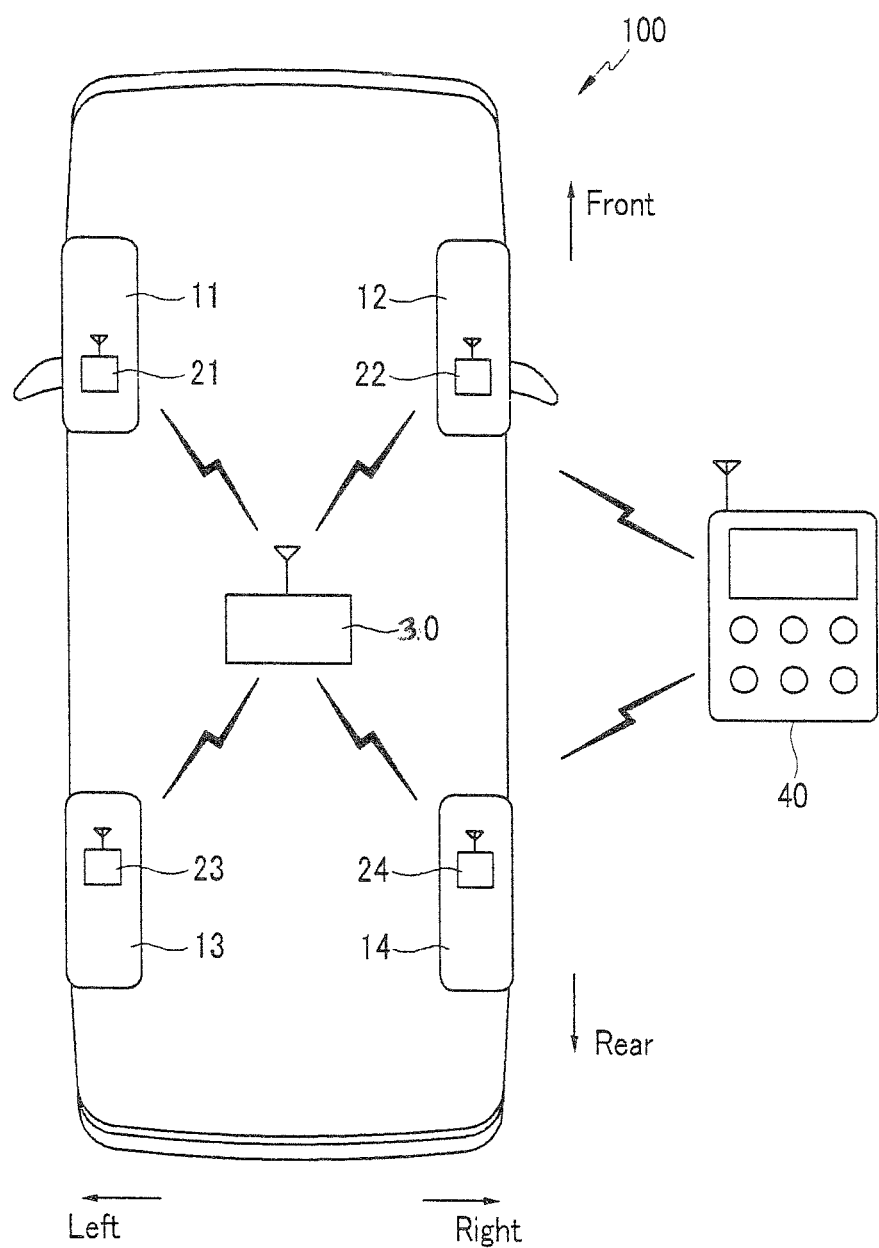
FIG. 1 is a schematic diagram of a tire position detecting system according to an exemplary embodiment of the present invention.

The present invention may be variously modified and may have various exemplary embodiments, and specific exemplary embodiments will be exemplified in the drawings and will be described in detail in a detailed description of the embodiments. However, it is noted that the present invention is not limited to the specific exemplary embodiments, but includes all possible modifications, equivalents, and replacements which fall within the spirit and scope of the present invention.

The terms including ordinal numbers such as first and second may be used in describing various constituent elements, but the constituent elements are not limited by the terms. The terms are used only to distinguish one constituent element from other constituent elements.

For example, a second constituent element may be named a first constituent element and a first constituent element may be named a second constituent element in a similar way without departing from the scope of the present invention.

It is noted that when it is described that a certain constituent element is "connected" or "electrically connected" to another constituent element, they may be directly connected or electrically connected to each other but a third constituent element may exist therebetween. On the contrary, it is also noted that when it is described that a certain constituent element is "directly connected" or "directly electrically connected" to another constituent element, a third constituent element does not exists therebetween.

The terms used herein are used only to describe specific exemplary embodiments, but do not intend to limit the present invention. A singular expression includes a plural expression unless it is clearly construed in a different way in the context. The terms used herein, such as "including" or "having", are used only to designate the features, number, steps, operations, constituent elements, parts, or combinations thereof described in the specification, but should be construed not to exclude existence or addition of one or more other features, numbers, steps, operations, constituent elements, parts, or combinations thereof.

Now, a tire position detecting system and a tire position detecting method according to exemplary embodiments of the present invention will be described in detail with reference to the drawings, and the same reference numerals are used to designate the same or corresponding constituent elements throughout the drawings and a duplicated description thereof will be omitted.

The exemplary embodiments of the present invention relate to a system and a method for detecting state information of a plurality of tires with a tire pressure monitoring system (hereinafter, referred to as TPMS) and detecting position information regarding to which tire of the plurality of tires a TPMS transmitter for transmitting the state information wirelessly is attached.

In the exemplary embodiments of the present invention, a vehicle having four tires is shown for convenience' sake, but the present invention may also be applied to a vehicle having more than four tires such as buses, trucks, or trailers.

Figures 2, 3:
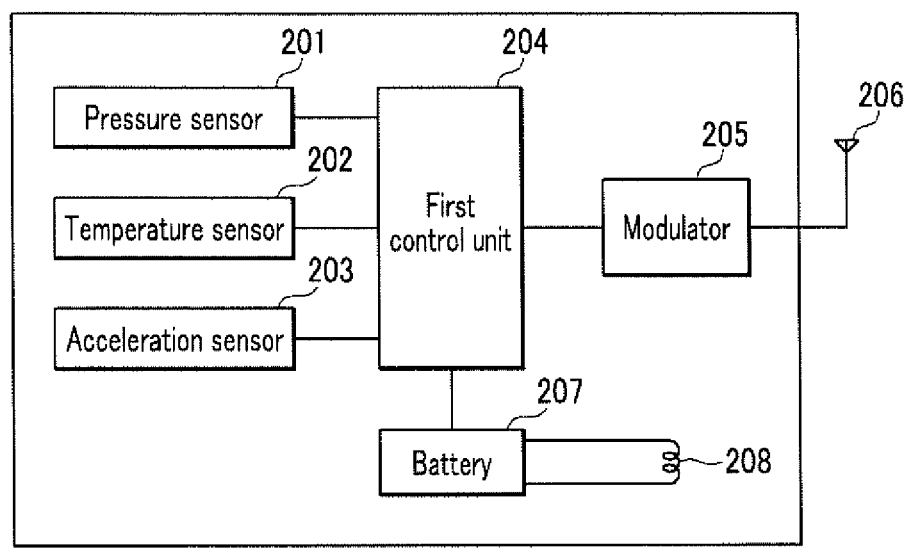
FIG. 2 is a schematic diagram of a transmitter according to the exemplary embodiment of the present invention.
FIG. 3 is a diagram of transmission data of the transmitter according to the exemplary embodiment of the present invention.
Figures 4, 5:
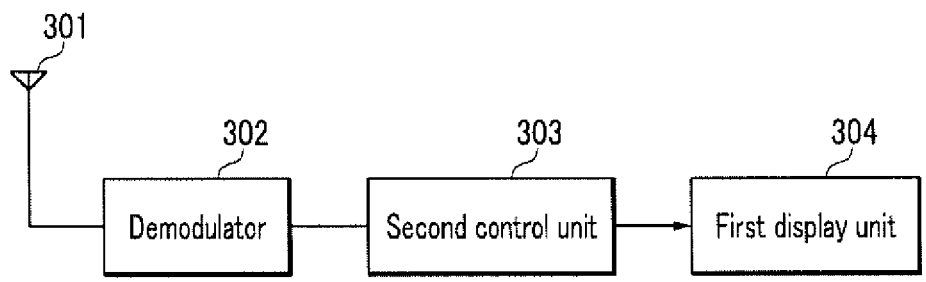
FIG. 4 is a schematic diagram of a receiver according to the exemplary embodiment of the present invention.
FIG. 5 is a view showing information stored in a memory of the receiver according to the exemplary embodiment of the present invention.
Figure 6:
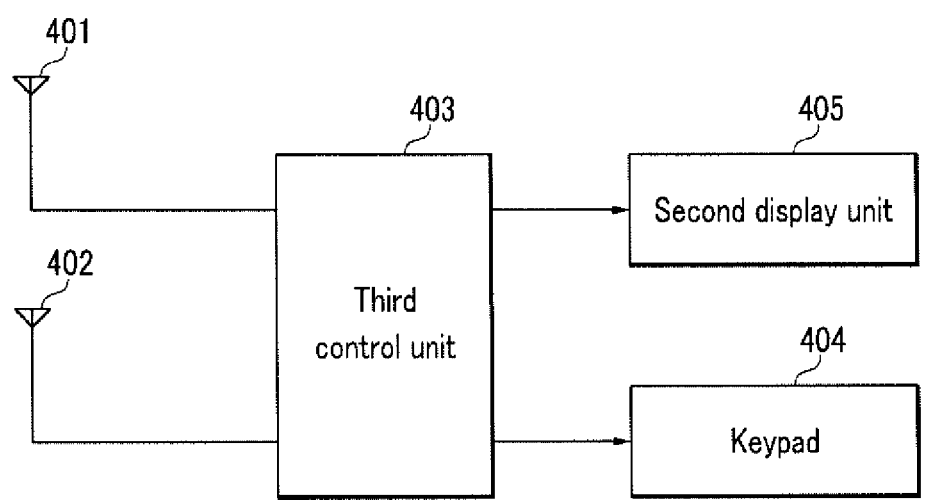
FIG. 6 is a schematic diagram of an external device according to the exemplary embodiment of the present invention.

FIG. 1 is a schematic diagram of a tire position detecting system according to an exemplary embodiment of the present invention. FIG. 2 is a schematic diagram of a transmitter according to the exemplary embodiment of the present invention. FIG. 3 is a diagram of transmission data of the transmitter according to the exemplary embodiment of the present invention. FIG. 4 is a schematic diagram of a receiver according to the exemplary embodiment of the present invention. FIG. 5 is a view showing information stored in a memory of the receiver according to the exemplary embodiment of the present invention. FIG. 6 is a schematic diagram of an external device according to the exemplary embodiment of the present invention.

As shown in FIG. 1, the tire position detecting system of the present invention includes a plurality of TPMS transmitters 21 to 24 (hereinafter, referred to as "transmitters") attached within a plurality of tires 11 to 14 of a vehicle 100, respectively, a TPMS receiver 30 (hereinafter, referred to as "receiver") attached to a portion of the vehicle 100 outside the tires 11 to 14, and an external device 40 located outside the vehicle 100.

As shown in FIG. 2, each of the transmitters 21 to 24 includes a pressure sensor 201 for detecting a tire pressure to output the tire pressure to a first control unit 204, a temperature sensor 202 for detecting an interior temperature of a tire to output the interior temperature of the tire to the first control unit 204, an acceleration sensor 203 for detecting a travel state of the vehicle 100 to output the travel state to the first control unit 204, the first control unit 204 for converting electrical signals input from the sensors to digital signals and performing a control operation, a modulator 205 for modulating a digital signal for wireless communication with the receiver 30, a first antenna 206 for wirelessly transmitting the modulated signal to the receiver 30, and a battery 207 for supplying electric power to the sensors 201, 202, and 203, the first control unit 204, and the modulator 205.

Then, each of the plurality of transmitters 21 to 24 further includes a coil-shaped second antenna 208 in communication with the external device 40, for receiving position location from the external device 40.

Although FIG. 2 illustrates the first antenna 206 for wireless communication with the receiver 30 and the second antenna 208 for wireless communication with the external device 40 separately, the present invention is not limited thereto, but the first antenna 206 and the second antenna 208 may be realized in one antenna.

A plurality of unique IDs are embedded in the plurality of transmitters 21 to 24, respectively, and the plurality of IDs are stored so as not to be changed. Although FIG. 2 illustrates that the IDs are stored in an embedded memory of the first control unit 204, the present invention is not limited thereto, but the plurality of transmitters 21 to 24 may include separate memory units, respectively.

Then, the first control unit 204 determines whether the vehicle 100 is in "a driving mode" or "a stop mode" according to a signal input from the acceleration sensor 203, and controls the second antenna 208 to receive position information from the external device 40 when the vehicle 100 is in a stop mode.

The plurality of transmitters 21 to 24 wirelessly communicates with the external device 40 through the second antenna 208 in the stop mode, and receives the position information of the tires 11 to 14 to which the plurality of transmitters 30 are attached from the external device 40. For example, the vehicle 100 of FIG. 1 is a vehicle having four tires 11 to 14, and includes a front left tire 11, a front right tire 12, a rear left tire 13, and a rear right tire 14. The external device 40 records first position information 001 corresponding to the front left tire 11 in the first transmitter 21 located in the front left tire 11, records second position information 010 corresponding to the front right tire 12 in the second transmitter 22, records third position information 011 corresponding to the rear left tire 13 in the third transmitter 23, and records fourth position information 100 corresponding to the rear right tire 14 in the fourth transmitter 24.

As described above, according to the present invention, when the plurality of tires 11 to 14 are initially mounted to the vehicle 100, the positions of the plurality of tires 11 to 14 may be recorded in the plurality of transmitters 21 to 24, respectively by using the external device 40.

According to the present invention, the recorded first to fourth position information elements are changeable information elements, and when the position of a tire of the vehicle 100 is changed or the tire is replaced by a new tire, the changed position information element may be changed and recorded in the transmitter by using the external device 40. However, a method of, when one of the plurality of tires is replaced by a new one, the receiver 30 being able to automatically detect a replaced tire even though the external device 40 does not record the changed position information in the plurality of transmitters 21 to 24 will be additionally described.

Unlike the stop mode, when the vehicle 100 is determined to be in a driving mode, the first control unit 204 controls such that the ID and tire position information element are transmitted to the receiver 30 at a first transmission time interval together with the state information of the tire detected by the pressure sensor 201 and the temperature sensor 202.

FIG. 3 is a diagram of transmission data of the transmitter according to the exemplary embodiment of the present invention, and as shown in FIG. 3, the transmission data contains an ID of the transmitter, an pressure detection value and a temperature detection value detected by the transmitter, position information of the tire to which the transmitter is attached, and a registration number of the vehicle 100 to which the tire is mounted. Here, the registration number may be recorded and changed by the external device 40 together with position information.

When the detected pressure value of the pressure sensor 201 is not less than a set reference pressure value in the driving mode, the first control unit 204 controls such that the state information, ID, and position information of the tire are transmitted to the receiver 30 at a second transmission time interval shorter than the first transmission time interval.

Accordingly, the present invention allows the driver to promptly recognize that the pressure of the tire is in a dangerous state.

As shown in FIG. 4, the receiver 30 includes a third antenna 301 for receiving IDs, tire state information, and position information from the plurality of transmitters 21 to 24, a demodulator 302 for demodulating a signal received from the third antenna 301, a second control unit 303 for processing the demodulated signal to store and output the processed signal, and a first display unit 304 for displaying to allow the driver to recognize the information stored in the second control unit 303.

As shown in FIG. 5, a memory (not shown) where "tire position numbers" corresponding to the positions of the tires of the vehicle 100, respectively are recorded is embedded in the second control unit 303. The number of the tire position numbers is the same as the number of the tires attached to the vehicle 100.

The second control unit 303 matches the tire position numbers of the memory to the first to fourth position information elements received from the plurality of transmitters 21 to 24, respectively, and controls such that the IDs and tire state information corresponding to the position information elements are recorded in fields of the matched tire position numbers.

In this case, if a new ID other than the IDs stored in the memory is received more than a preset reference number of times within a second set reception time period with some of the IDs stored in the memory not being received within a first set reception time period, the second control unit 303 matches the new ID with the tire position number of the ID which has not been received.

Then, the new ID is matched with the tire position number of the ID which has not been received, and thereafter, the tire state information received together with the new identification number is recorded in a field of the new ID and the matched tire position number.

Due to this, according to the present invention, when one of the tires 11 to 14 of the vehicle 100 is replaced by a new tire, the receiver 30 can automatically detect a position of the new tire without using the external device 40.

Here, the reference number of times is based on a total number of times by which receptions are made within the preset second reception time period. The present invention can prevent the receiver 30 from detecting an ID of another adjacent vehicle as a new ID in a state where the tire of the vehicle 100 is replaced, by setting the second reception time period during which a new ID is input to be longer than the first reception time period during which no ID is input.

As shown in FIG. 6, the external device 40 includes a fourth antenna 401 for communicating with the plurality of transmitters 21 to 24, a fifth antenna 402 for receiving signals transmitted from the plurality of transmitters 21 to 24 and communicating with the receiver 30, a third control unit 403 connected to the fourth antenna 401 and the fifth antenna 402 to control such that the position information stored in the plurality of transmitters 21 to 24 is changed when a position of the tire is changed or the tire is replaced, a keypad 404 for allowing a user to input the tire position information through the third control unit 403, and a second display unit 405 for displaying the information received from the plurality of transmitters 21 to 24.

The signal transmitted through the fourth antenna 401 is a low frequency (LF) signal, and the signal transmitted and received through the fifth antenna 402 is a radio frequency (RF) signal.

Figure 7:
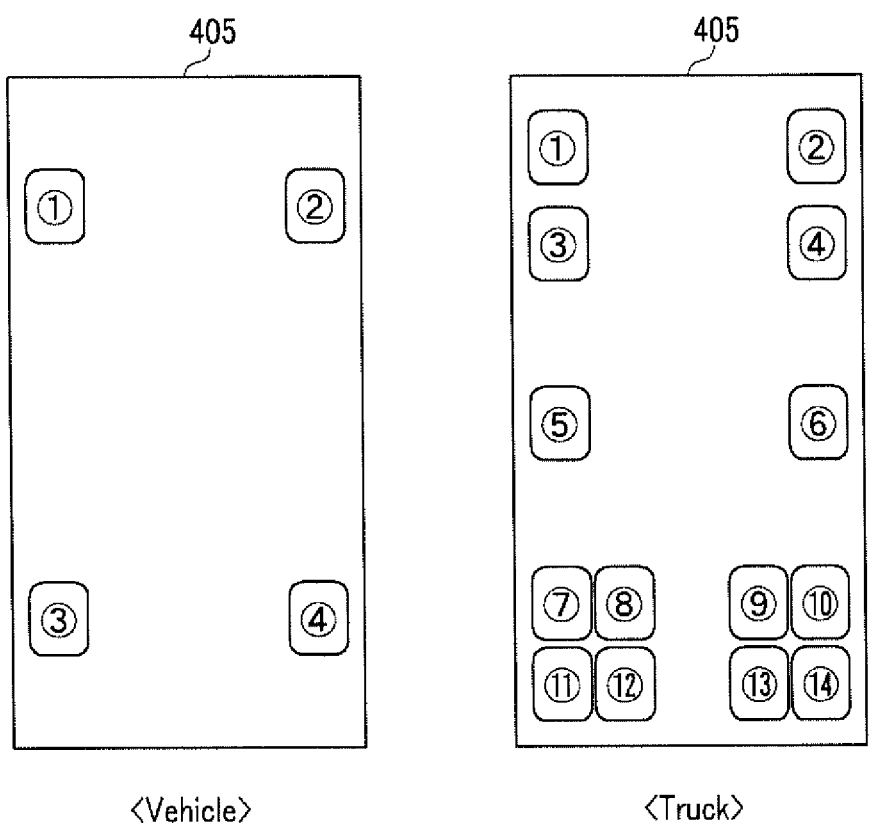
FIG. 7 is an exemplary view showing a second display unit of the external device according to the exemplary embodiment of the present invention.

FIG. 7 is an exemplary view showing a second display unit of the external device according to the exemplary embodiment of the present invention.

As shown in FIG. 7, positions of a plurality of tires may be displayed on the second display unit 405 depending on the type of a vehicle, and a user may touch the second display unit 405 to select a transmitter attached to a tire of which position information is to be input and wirelessly communicate with the selected transmitter.

Figure 8:
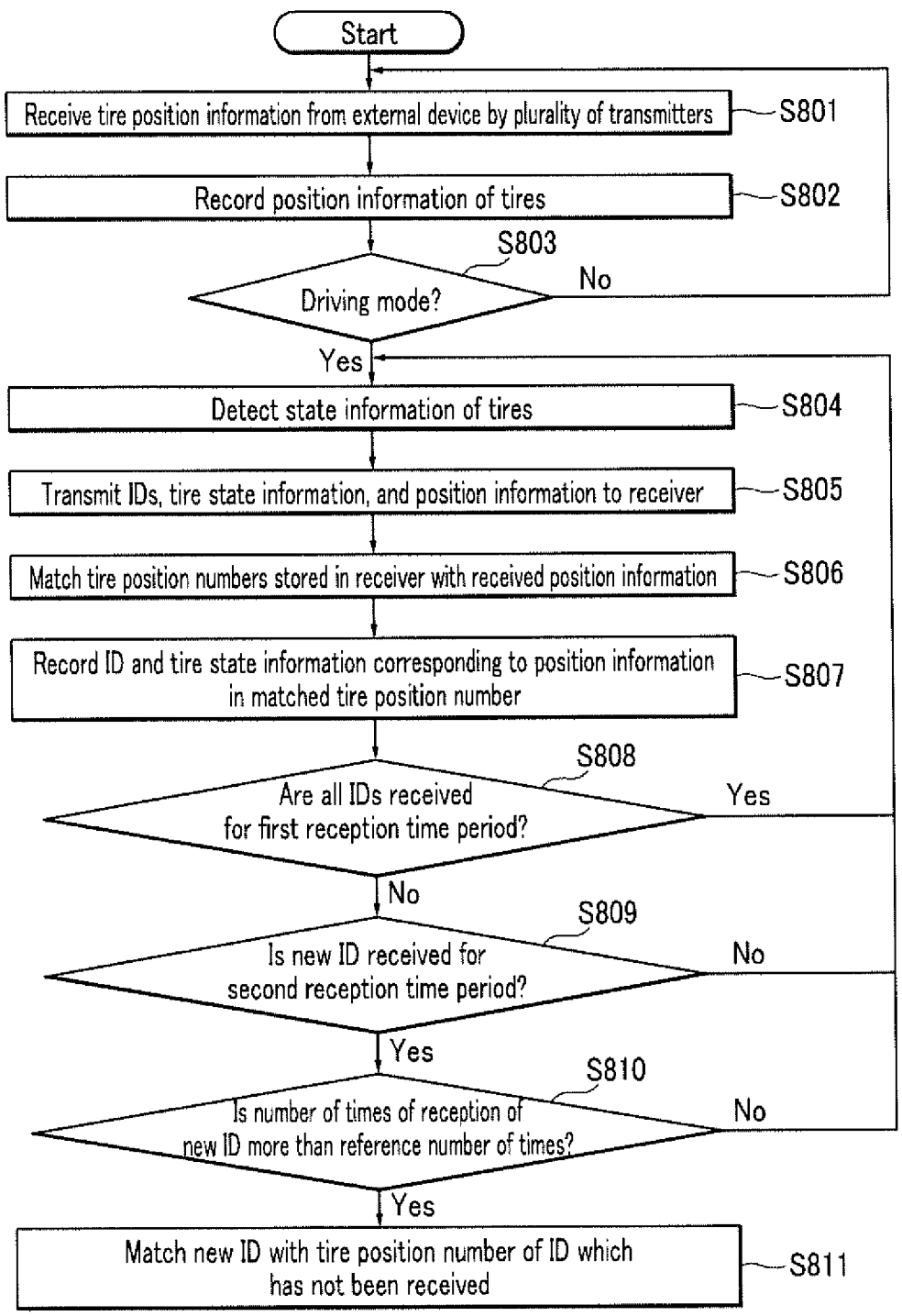
FIG. 8 is a flowchart showing a tire position detecting method according to an exemplary embodiment of the present invention.

FIG. 8 is a flowchart showing a tire position detecting method according to an exemplary embodiment of the present invention.

As shown FIG. 8, a plurality of transmitters 21 to 24 receive position information of tires where the transmitters are located, respectively from an external device 40 while a vehicle 100 is stopped (S801), and record the received tire location information in a memory in the plurality of transmitters 21 to 24 (S802).

As described above, the present invention inputs position locations of the tires to the plurality of transmitters 21 to 24 attached to the plurality of tires 11 to 14, respectively by using the external device 40 when the plurality of tires 11 to 14 are initially mounted to the vehicle 100.

If the vehicle 100 turns into a driving mode (S803), the plurality of transmitters 21 to 24 detect state information of the tires such as pressures, temperatures, and the like (S804), and transmit transmission data (IDs, tire state information, position information, and the like) shown in FIG. 3 to the receiver 30 (S805).

The receiver 30 matches position information of the transmission data with a tire position number stored in a memory of the receiver 30 (S806), and records IDs, tire state information, and the like corresponding to the position information in a field allocated to the matched tire position number (S807).

In the driving mode, the plurality of transmitters 21 to 24 transmit transmission data at a first transmission time interval, and the receiver 30 repeats a process of matching the position information of the transmission data received at the first transmission time interval with the tire position number to record the matched information.

The receiver 30 determines whether or not all of the IDs stored in the receiver 30 are received within a first set reception time period (S808), and if it is determined that some of the IDs have not been received, determines whether or not a new ID other than the IDS stored in the receiver 30 is received for a second reception time period (S809).

If a new ID is received by more than a preset reference number of times for the second reception time period (S810), the receiver 30 matches the new ID with a tire position number of the ID which has not been received (S811).

Thereafter, the transmission data received from the transmitter having the new ID are stored in a field allocated to the matched tire position number.

In this way, in the present invention, the receiver 30 can automatically detect a position of a new tire without using the external device 40 when one of the tires 11 to 14 of the vehicle 100 is replaced by the new tire.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A tire position detecting system, comprising:
a plurality of transmitters attached within a plurality of tires to detect state information of the plurality of tires and in which IDs of the tires are stored, respectively, each transmitter having a unique ID;
an external device for recording position information of the plurality of transmitters positioned in a vehicle in the plurality of transmitters, respectively; and
a receiver for receiving the IDs, the tire state information, and the position information from the plurality of transmitters,
wherein the receiver includes a memory in which tire position numbers corresponding to the positions of the tires of the vehicle, respectively are recorded, and wherein the tire position numbers are matched with the position information received from the transmitters, and the tire state information and the IDs corresponding to the position information are recorded in fields allocated to the matched tire position numbers,
wherein if a new ID other than the IDs stored in the memory is received by more than a predetermined reference number of times with some of the IDs stored in the memory not being received within a first set time period, the receiver matches the new ID with the tire position number of the ID which has not been received.

2. The tire position detecting system of claim 1, wherein the external device records changed position information in the transmitter whose position in the vehicle is changed.

3. The tire position detecting system of claim 1, wherein a reference number of times is based on a number of times by which receptions are made within a second preset time period, and the second time period is longer than the first time period.

4. The tire position detecting system of claim 1, wherein the tire information contains pressure information of the tire.

5. A tire position detecting method of a tire position detecting apparatus including: a plurality of transmitters each having a unique ID attached within a plurality of tires to detect state information of the plurality of tires and in which IDs of the tires are embedded, respectively; and a receiver for receiving the tire state information, and the IDs from the plurality of transmitters, the method comprising the steps of:
receiving, by the plurality of transmitters, position information of the plurality of transmitters positioned in a vehicle from an external device located outside the vehicle, respectively;
if the vehicle is determined to be in a driving mode, detecting, by the plurality of transmitters, the state information of the plurality of tires;
transmitting, by the plurality of transmitters, the IDs and the position information to the receiver together with the detected tire state information;
matching, by the receiver, the tire position numbers stored in a memory of the receiver in advance with the position information and storing in the memory the IDs and the tire state information corresponding to position information in the matched tire position number;
determining, by the receiver, whether or not all of the IDs stored in the memory are received within a first set time period;
determining, by the receiver, whether or not a new ID other than the IDs stored in the receiver is input for a second time period by more than a predetermined reference number of times with some of the IDs not being received; and if the new ID is received by a preset reference number of times for a second time period, matching, by the receiver, the new ID with the tire position number of the ID which has not been received.

6. The tire position detecting method of claim 5, further comprising:

changing the position information of the transmitter whose tire position in the vehicle is changed by a signal received from the external device.

7. The tire position detecting method of claim 5, wherein the second time period is longer than the first time period.

8. The tire position detecting method of claim 5, wherein the reference number of times is larger than a number of times of one ID input within the first time period.

9. The tire position detecting method of claim 5, wherein the tire information contains pressure information of the tire.

* * * * *